US012702993B2

(12) United States Patent
Marelli

(10) Patent No.: US 12,702,993 B2
(45) Date of Patent: Aug. 11, 2026

(54) MANUALLY OPERATED PUMP

(71) Applicant: SILGAN DISPENSING SYSTEMS MILANO S.R.L., Richmond, VA (US)

(72) Inventor: Andrea Marelli, Milan (IT)

(73) Assignee: Silgan Dispensing Systems Milano S.R.L., Milan (IT)

( * ) Notice: Subject to any disclaimer, the term of this patent is extended or adjusted under 35 U.S.C. 154(b) by 95 days.

(21) Appl. No.: 18/696,646

(22) PCT Filed: Sep. 29, 2022

(86) PCT No.: PCT/IB2022/059290
§ 371 (c)(1),
(2) Date: Mar. 28, 2024

(87) PCT Pub. No.: WO2023/057860
PCT Pub. Date: Apr. 13, 2023

(65) Prior Publication Data
US 2024/0375134 A1 Nov. 14, 2024

(30) Foreign Application Priority Data
Oct. 7, 2021 (IT) ........................ 102021000025532

(51) Int. Cl.
*B05B 11/00* (2023.01)
*B05B 11/10* (2023.01)

(52) U.S. Cl.
CPC ...... *B05B 11/1008* (2023.01); *B05B 11/0044* (2018.08); *B05B 11/1046* (2023.01)

(58) Field of Classification Search
CPC ............. B05B 11/1008; B05B 11/0044; B05B 11/1046; B05B 11/1047; B05B 11/1059; B05B 11/1023; B05B 11/0029
See application file for complete search history.

(56) References Cited

U.S. PATENT DOCUMENTS 3,949,906 A * 4/1976 Pettersen ............ B05B 11/1059 222/321.9
5,405,057 A * 4/1995 Moore ................ B05B 11/1023 222/321.9

(Continued)

*Primary Examiner* — Vishal Pancholi
(74) *Attorney, Agent, or Firm* — Hinckley Allen & Snyder; Stephen Holmes

(57) ABSTRACT

A manually operated pump (1), comprising a cup-shaped body (2) inside which a piston (3)—coupled with a hollow stem (4) for the movement thereof within the cup-shaped body (2)—sealingly slides, the pump being equipped with a base (5) which seals the cup-shaped body (2) and which is endowed with a hole (11) for the stem (4), the said stem (4) and the base (5) being torsionally coupled, at least part of the cup-shaped body (2) and of the piston (3) delimiting a compression chamber (6) coupled with at least one suction valve element (8) and with a delivery valve element (9), the said delivery valve element (9) being in communication with a cavity in the stem (4), a dispensing button (10) being sealingly fitted on the stem (4), the said button (10) and the stem (4) being mutually constrained so that the button rotates, in a limited manner, around an axis (A) of the stem (4) between a first dispensing position and a second closed position, in which at least one tooth (D) of the button abuts a surface (13) of a ring nut (12) so as to prevent a stem (4) stroke; the ring nut (12) can be coupled torsionally to the base (5) or to the cup-shaped body (2) in at least two alternative assembly positions, such that, if the ring nut (12) is in its first assembly position and the button (10) is in the dispensing position, a first groove (S1) of the ring nut faces the tooth (D) which can slide in it up to a first end-stroke (F1), allowing a first stroke of the stem (4) and which, if the ring nut (12) is in its second assembly position and the button (10) is in the dispensing position, a second groove (S2) of the ring faces the tooth (D) which can slide in it up to a second end-stroke (F2), allowing a second stroke of the stem (4) different from the first stroke of the stem, so that, (Continued)

during the assembly of the pump, the positioning of the ring nut (12) in the first or second assembly position (2) determine a first or second dispensing volume of the pump.

14 Claims, 4 Drawing Sheets

(56) References Cited

U.S. PATENT DOCUMENTS

| | | | | |
|---|---|---|---|---|
| 5,549,223 | A * | 8/1996 | Hori | B05B 11/1097 222/321.9 |
| 5,615,806 | A * | 4/1997 | Grothoff | B05B 11/1059 222/384 |
| 5,899,363 | A * | 5/1999 | Bliss, III | B05B 11/0029 222/321.9 |
| 6,334,549 | B1 * | 1/2002 | Fernandez | B05B 11/1069 222/321.9 |
| 7,108,160 | B2 * | 9/2006 | Moretti | B05B 11/1023 222/321.9 |
| 9,999,896 | B2 * | 6/2018 | Ophardt | B05B 7/0037 |
| 10,335,816 | B1 * | 7/2019 | Arminak | B05B 11/1023 |
| 2003/0150880 | A1 * | 8/2003 | Marelli | B05B 11/105 222/321.7 |
| 2012/0024907 | A1 * | 2/2012 | Law | B05B 11/1074 222/256 |
| 2012/0267399 | A1 * | 10/2012 | Moretti | B05B 11/1008 222/321.2 |
| 2017/0128966 | A1 * | 5/2017 | Law | B05B 11/0027 |

* cited by examiner

MANUALLY OPERATED PUMP

BACKGROUND OF THE INVENTION

Field of the Invention: The present invention relates to a manually operated pump.

Description of Related Art: As is known, manually operated pumps—for example for dispensing perfumes, creams, etc.—dispense a predetermined volumetric amount of product each time they are operated.

The volumetric amount dispensed is a predefined design specification and is determined by the said pump design.

Therefore, if a predetermined volume is required, it is necessary to design a specific pump for that volume, with parts projected specifically for this purpose.

BRIEF SUMMARY OF THE INVENTION

The object of the present invention is to provide a manually operated pump which is improved with respect to the prior art.

A further object of the invention is to provide a manually operated pump wherein the dispensing volume can be selected during assembly, simply through the mutual positioning of certain parts.

This and other objects are achieved by means of a manually operated pump produced according to the technical teachings of the claims annexed hereto.

Advantageously, by mutually positioning other parts during pump assembly, an airless or vented configuration can be obtained.

BRIEF DESCRIPTION OF THE SEVERAL VIEWS OF THE DRAWINGS

Further features and advantages of the innovation will become clearer in the description of a preferred but not exclusive embodiment of the manually operated pump, illustrated—by way of a non-limiting example—in the drawings annexed hereto, in which.

DETAILED DESCRIPTION OF THE INVENTION

Figure 1:
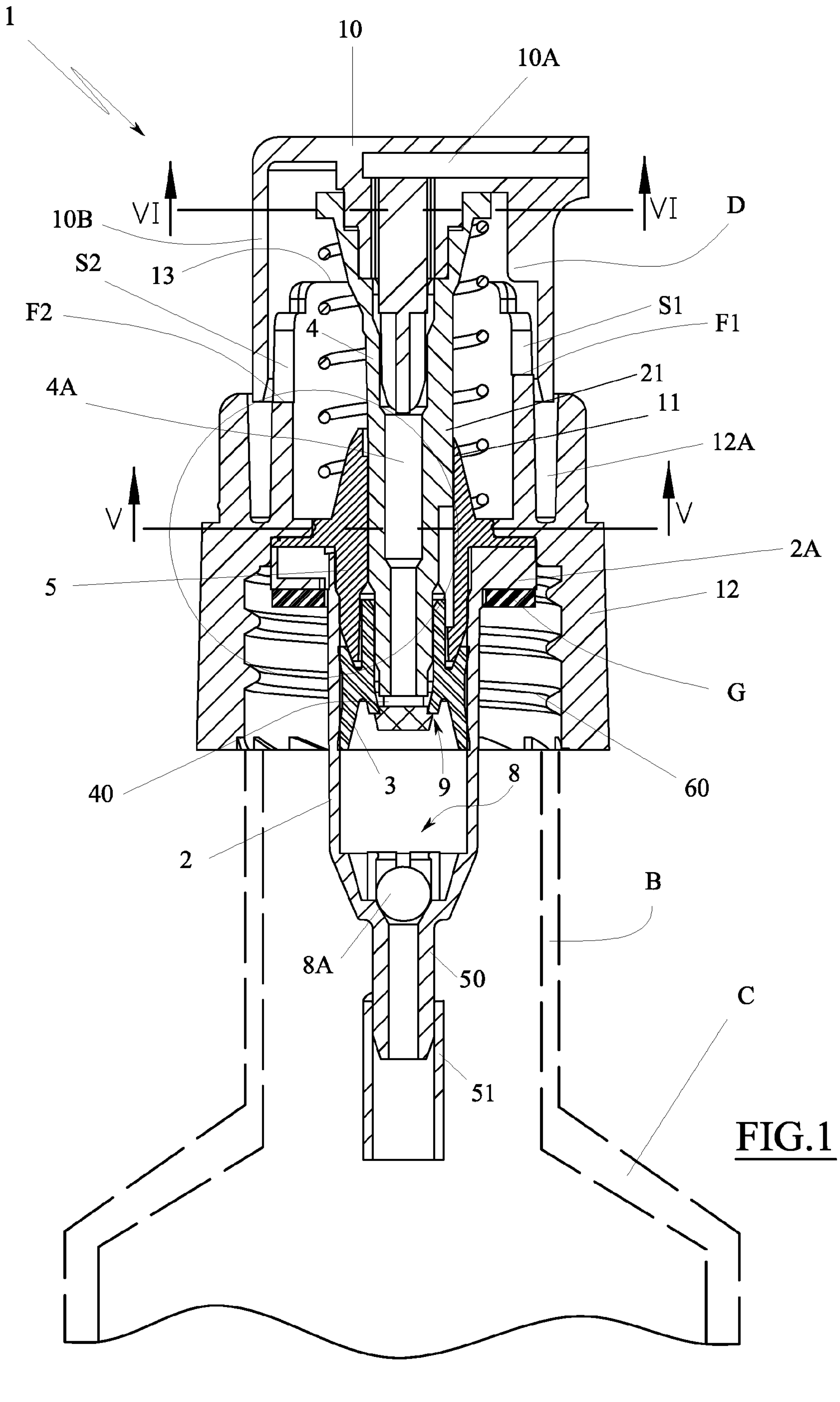
FIG. 1 is a sectional view of the pump according to the present invention, taken along line I-I in FIG. 5.
Figure 2:
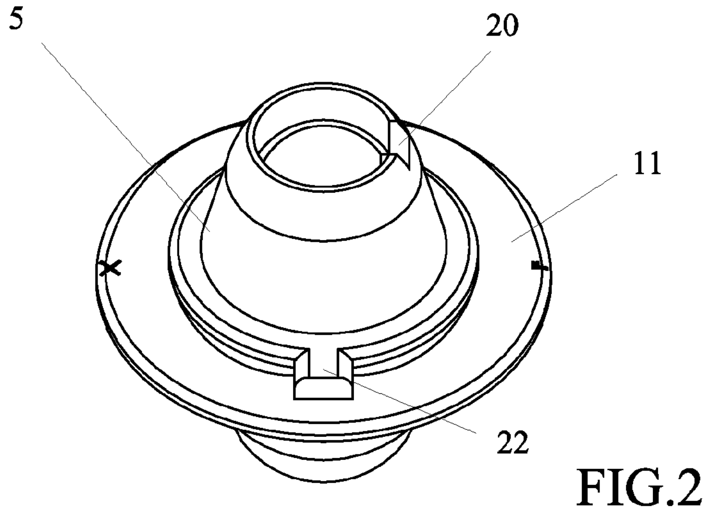
FIG. 2 is a perspective view of a base of the pump of FIG. 1.

With reference to the above figures, reference number 1 is used to denote, as a whole, a manually operated pump.

The manually operated pump comprises a cup-shaped body 2 inside which a piston 3 (coupled with a hollow stem 4 for the movement thereof within in the cup-shaped body 2) sealingly slides.

At least part of the cup-shaped body 2 and part of the piston 3 delimit a compression chamber 6 coupled with at least one intake valve element 8 and with a delivery valve element 9. The delivery valve element 9 is in communication with a cavity 4A in the stem 4.

More specifically, the piston 3 may be of the double-lip kind and may be fitted onto the stem 4 so as to slide, in a limited manner, between a raised position, in which the said piston opens an aperture 40 in communication with a cavity 4A in the stem, and a lowered position, in which the said piston closes the said aperture 40. In fact, the piston and the stem act as a delivery valve element 9.

The suction valve element 8 may conventionally consist of a ball 8A arranged on the bottom of the cup-shaped body, in communication with a duct 50 that flows (possibly through a suction tube 51) to the outside of the cup-shaped body 2. Obviously, other kinds of commonly known valve elements are possible.

When the pump 1 is mounted on a container C, the duct 50 flows into the container from which a fluid substance to be dispensed (not shown) is suctioned.

In the event that the container C features a piston (or a deformable bag), the shape of the body 2 near the suction valve element 8 will be different from that shown and suitable for the technology in use.

The fluid substance to be dispensed may be a cream, perfume, deodorant, medical substance, or any other fluid substance that the pump can handle.

The pump has a base 5, which closes the cup-shaped body 2 and is equipped with a hole 11 for the stem 4.

The stem 4 and the base 5 may be torsionally coupled.

For example, the stem may feature a guide 21 engaged in a counter-guide 20 on the base 5 so as to achieve the said torsional coupling. Alternatively, a ribbed edge or any other commonly known means may be envisaged to maintain the torsional alignment between the stem 4 and base 5 (or cup-shaped body 2) while also allowing the stem to slide in relation to the base 5.

A dispensing button 10 is sealingly fitted to the stem 4. The button 10 may feature a delivery port or a nebulising nozzle, depending on the intended uses.

The button 10 and the stem 4 may be mutually constrained so that the button rotates, in a limited manner, around an axis A of the stem 4 between a first dispensing position and a second closed position.

Figure 6:
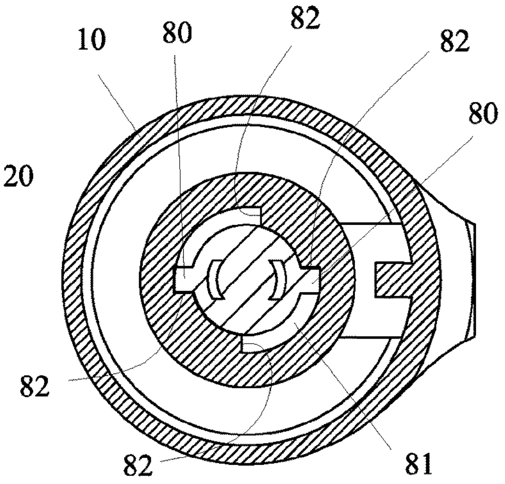
FIG. 6 is a sectional view taken along line VI-VI of FIG. 1.

For example, as can be seen in FIG. 6, the stem may feature at least one abutment 80, the said abutment being inserted in a guide 81 on the button which features two stops 82 for the abutment 80. Preferably, two abutments and two guides etc. are featured. In the configuration shown, the button 10 may rotate around the stem by 90°.

In the closed position, at least one tooth D (FIG. 1) of the button can abut a surface 13 of a ring nut 12 so as to prevent a stem 4 stroke.

Furthermore, when the button is in the said closed position, a cavity 4A in the stem may be isolated from a delivery port 10A in the button 10.

Basically, when the button is rotated (around the stem) into the closed position, a dispensing passage is hermetically sealed. While when the button is rotated into the dispensing position, the cavity 4A in the stem is in communication with the delivery port 10A in the button. In fact, the button 10 acts as a valve that either opens or closes the dispensing duct.

According to one aspect of the invention, the ring nut 12 may be coupled torsionally to the base 5 (or to the cup-shaped body 2) in at least two alternative mounting positions which are such that if the ring nut 12 is in the first assembly position envisaged therefor (and the button 10 is in the dispensing position), a first groove S1 in the ring nut is facing the tooth D, which can slide therein up to a first end-stroke F1, allowing the stem 4 to perform a first stroke.

If, however, the ring nut 12 is in the second assembly position envisaged therefor (and the button 10 is in the dispensing position), a second groove S2 in the ring nut is facing the tooth D, which can slide therein up to a second end-stroke F2, allowing the stem 4 to perform a second stroke which is different from the first stem stroke.

Figure 3:
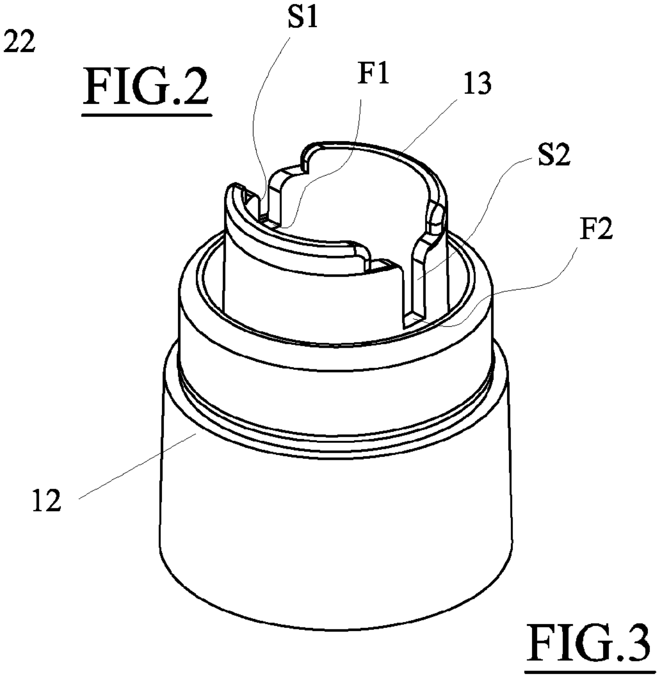
FIG. 3 is a perspective view of a ring nut of the pump in FIG. 1.
Figure 4:
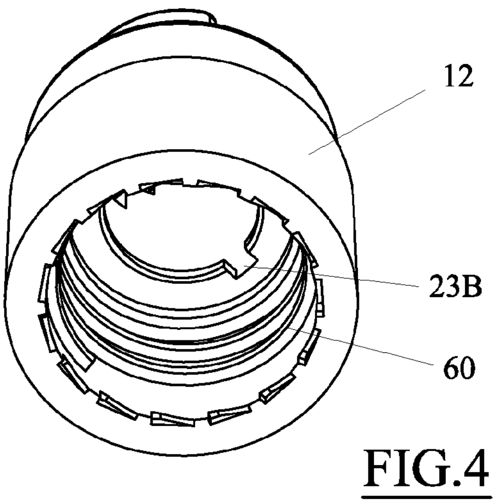
FIG. 4 is a perspective view, taken from another angle, of the ring nut of FIG. 3.

The grooves are clearly visible in FIG. 3. In the upward facing part of FIG. 3, it should be noted that each groove S1, S2 may be endowed with a rather wide opening, which is designed to house the structure of the button where the delivery port 10A is made.

Therefore, during pump assembly, positioning the ring nut 12 in the first or second assembly position 2 determines (or in other words allows the selection of) either a first or a second dispensing volume for the pump.

In this case, the first and second positions in which the ring nut 12 is fitted are angularly spaced of 180°. References (not further detailed) may be featured on the ring nut (but also on the cup-shaped body or on the base), which are useful when the parts are mutually positioned by an automatic assembly machine.

It should be noted that once the pump is assembled, the dispensing volume can no longer be selected and is therefore predetermined for the end user.

Basically, with a single ring nut, it is possible to obtain two kinds of pump (featuring different dispensing volumes) without changing any part of the said pump or without revolutionising or changing the design thereof.

In fact, it is no longer necessary to keep stocks of parts needed to build two pumps (each one featuring just one volume which is different from the other) because the same pump can be adapted to obtain two different dispensing volumes, through the positioning (or orientation) of the ring nut on the base (or on the cup-shaped body) during assembly.

Basically, from a manufacturing perspective, avoiding an article size change (which is conventionally necessary in order to change the dispensing amount of a conventional pump) would have an important impact for the moulding department since it would no longer be necessary to change the moulds for the different dispensing amounts, thereby preventing the delays, costs, storage needs etc. relating to this need.

The assembly departments would also benefit greatly from the use of the invention since it would not be necessary to change parts of the assembly machines, thereby no longer emptying the vibratory bowls and the other automatic assembly machine pathways.

Last but not least, there would be fewer components in stock, thereby improving business management and efficiency.

Figure 5:
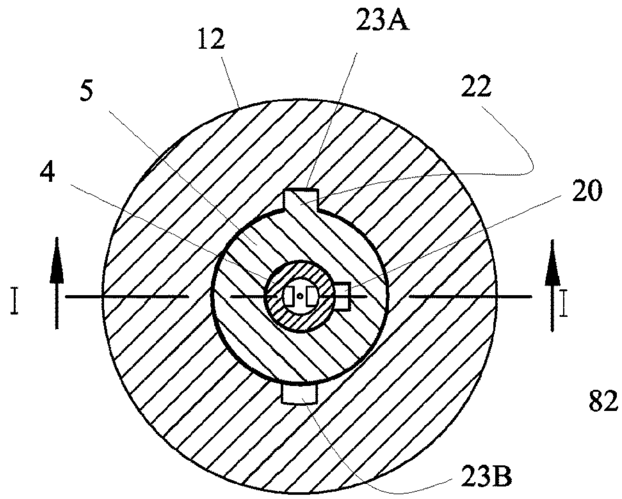
FIG. 5 is a sectional view taken along line V-V of FIG. 1.

Reference will now be made to FIG. 5. For the coupling with the ring nut 12, the base 5 may feature an alignment tooth 22 which can be engaged in either a first seat 23A or a second seat 23B in the ring nut 12. When the tooth is engaged in the first seat 23A, the pump 1 is in the said first assembly position, while when the tooth is engaged in the second seat, the pump 1 is in the said second assembly position.

To facilitate handling of the pump after assembly, the base 5 can be snap-engaged (for example through the undercut 51) with the ring nut 12.

For aesthetic purposes, the ring nut 12 may feature an annular seat 12A into which a skirt 10B on the button 10 slides. The skirt 10B may be configured to hide the first groove S1 and the second groove S2 from view.

The ring nut 12 may feature a threaded coupling 60 with a neck of the container C.

According to a further aspect of the invention, the base 5 may be torsionally coupled to the cup-shaped body 2 in at least two alternative angular assembly positions which are such that, if the base 5 is in the first assembly position envisaged therefor, a passage P is open (between the base 5 and the body in the cup 2) which—at least in certain positions of the piston 3 (for example in the position in FIG. 7)—puts the outside of the pump 1 in communication with the outside of the cup-shaped body 2 (therefore with the inside of the container C, when the pump 1 is on the container); if the base 5 is in the second assembly position thereof, the passage P is closed and the pump is of the airless kind.

In this way, one simply has to choose to position the base 5 on the cup-shaped body 2 in one way or another, so as to obtain either a vented pump or an airless pump.

This device provides great savings since the pumps according to the commonly known technique are either airless or vented and there is no possibility of choosing the characteristics thereof (during assembly).

The advantages linked to this innovation are multiple since it would be enough to have a single set of moulds to make both airless and vented pumps (instead of the conventional two sets of moulds). This would greatly simplify business management by improving the efficiency of the moulding and assembly departments, warehouse, etc.

Furthermore, a single mould to manage the both the airless and the venting pump type would offer considerable monetary savings.

Obviously, the lower outer edge of the cup-shaped body would need to be designed so as to support both versions, as will be mentioned later.

Also in this case, once the producer has chosen how to set the pump (airless or vented) during assembly, the user can no longer change the operation thereof.

Advantageously, the base 5 features a narrow flange 5A sandwiched between the ring nut 12 and the cup-shaped body 2.

The cup-shaped body 2 is, in turn, preferably equipped with a further flange 2A designed to abut, by means of a gasket G, a free surface of the mouth B of the container C to which the pump will be coupled during use.

One between the base 5 and the cup-shaped body 2 may feature a projection 30 configured to sealingly close off the passage P made in the other between the cup-shaped body 2 and the base 5, when the base 5 is in the second assembly position envisaged therefor (airless pump).

Figure 9:
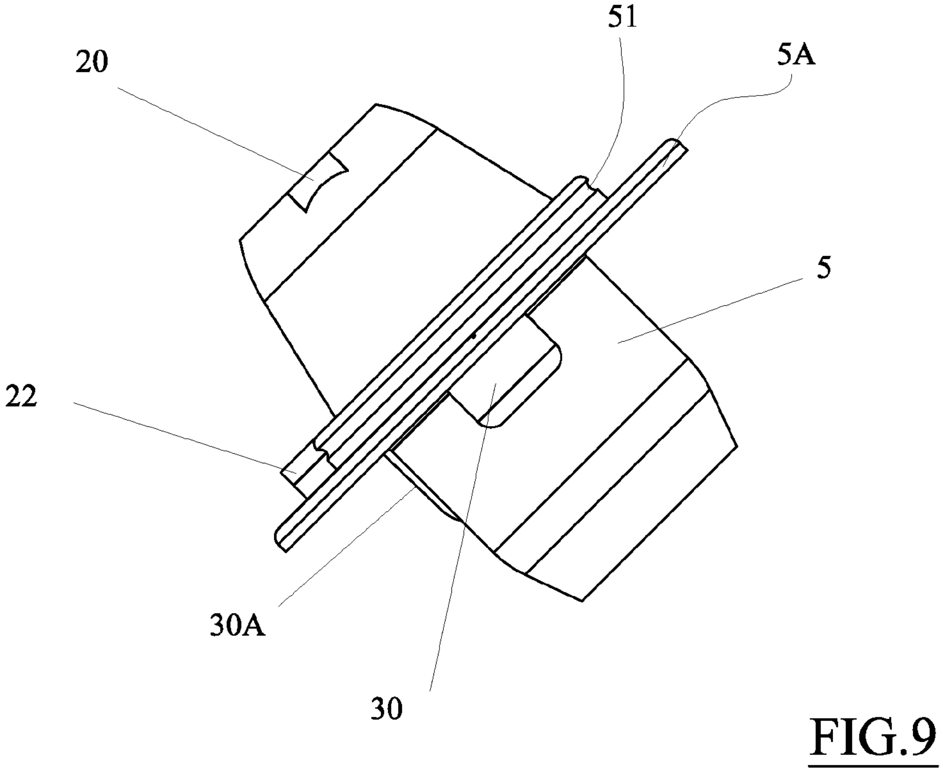
FIG. 9 is a perspective view, taken from another angle, of the base of FIG. 2.

In the described solution (FIG. 9) the projection 30 is on the base 5.

In a section of the said passage P, a compartment 36 may be featured to house the said projection 30 (in the airless configuration) or a filter that filters the air that flows through the said passage P (if the pump is in the vented configuration).

The cup-shaped body 2 may feature a further seat 35 configured to house the said projection 30 when the base 5 is in the first assembly position envisaged therefor (vented pump).

Obviously, a specular configuration is also possible, wherein the projection is featured on the cup-shaped body 2, while the compartment or the further seat may be featured on the base 5.

Figure 7:
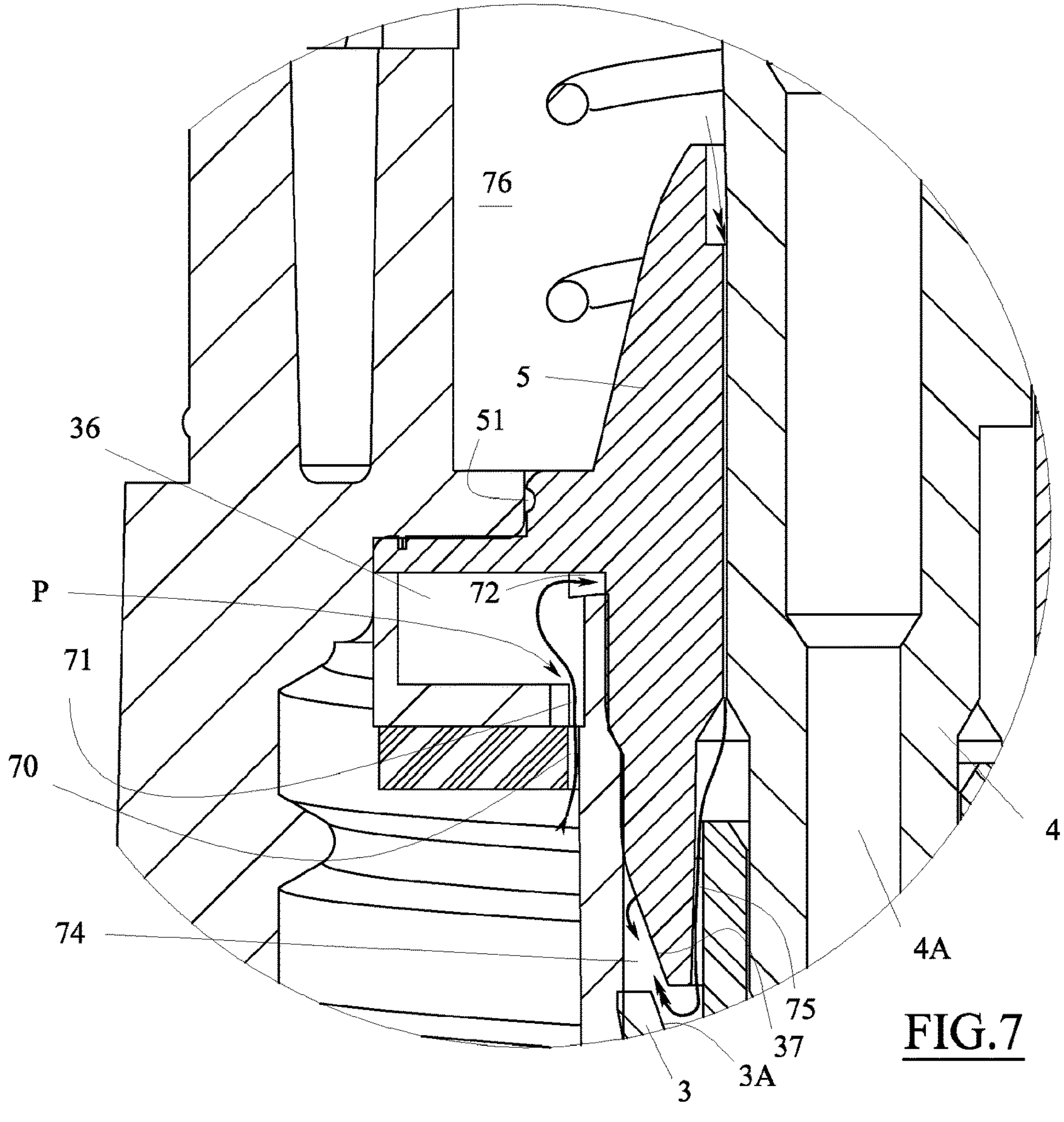
FIG. 7 is an enlargement of the part circled in FIG. 1, when a pump button has just been pressed.

An embodiment example of the passage P is illustrated clearly in FIG. 7.

More specifically, starting from the outside of the cup-shaped body (and therefore from the inside of the container if the pump is mounted thereon), there is a first section 70 of the passage P made between the cup-shaped body and the gasket G. A second section 71 of the passage is essentially located at the base of the flange of the cup-shaped body. The said section opens into the compartment 36.

If the projection 30 is inserted into the compartment 36, the passage P is completely isolated and the pump is of the airless kind. In fact, the projection 30 forms a seal by isolating the passage P from the outside of the cup-shaped body.

The projection 30 may also be fixed in the compartment 36 by snap-fitting (or interference-fitting), so that once assembled, the base and the cup-shaped body remain permanently joined.

Figure 8:
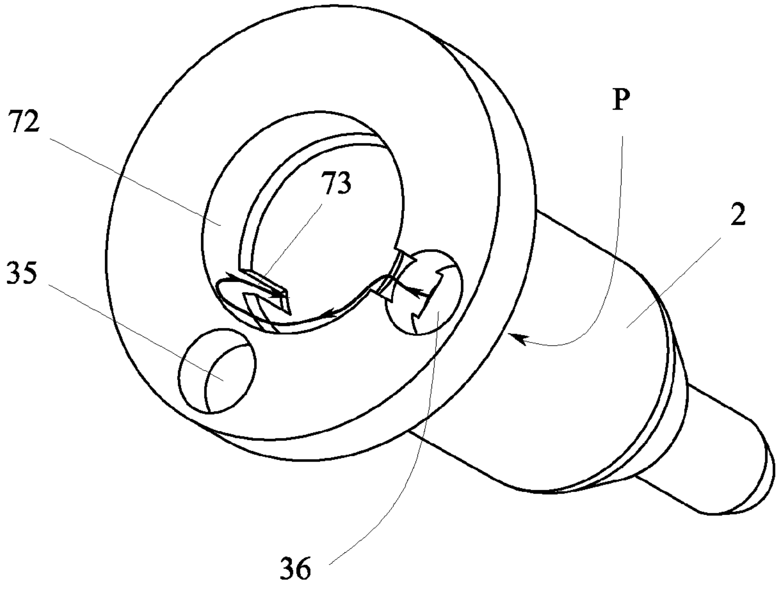
FIG. 8 is a perspective view of a cup-shaped body of the pump in FIG. 1.

If the projection is not in the compartment 36, the passage P continues with a third section 72 (visible only partially in FIG. 7, but clearly visible in FIG. 8).

In fact, the third section 72 is defined-between the cup-shaped body 2 and the base 5—by means of a hollow portion of the wall of the cup-shaped body 2 with a larger diameter.

The third section joins a fourth section 73 (FIG. 8), which is in communication with the zone denoted by reference number 74 in FIG. 7. The said zone is located in the cup-shaped body 2, above the piston 3.

The passage P continues (at least, when the piston 3 is in the position in FIG. 7 or at the beginning of the piston 3 stroke) with a fifth section 75 which is essentially obtained between the base 5 and the stem 4. The said section opens towards the outside of the pump (as seen in FIG. 7) essentially in the volume 76 (vented) which is delimited by the stem 4, the base 5, the ring nut 12, and the button 10.

Even when the pump is in the vented configuration thereof, the passage P is only open when the piston 3 is at the beginning of the stroke.

Even during this short period only, the opening of the passage P is sufficient to rebalance the pressure inside the container C, when the pump is mounted thereon and part of the fluid therewithin has been dispensed by pump 1.

On the other hand, when the piston 3 is in the upper end-of-stroke position, i.e. abutting the base 5, the base 5 and the piston 3 each feature a sealingly coupling surface 3A, 37 configured to close off the passage P.

In this way, even when the pump and the container are turned upside down, there is no fluid substance loss.

To end the description, it should be noted that, when the pump is in the airless configuration (therefore when the base is assembled with the projection 30 in the compartment 36 so as to close off the passage P), the base 5 may feature a further projection 30A which closes (sealingly insulating) the fourth section 73. The further projection is visible in FIG. 9.

Various embodiments of the innovation have been disclosed herein, but further embodiments may also be conceived using the same innovative concept.

What is claimed is:

1. A manually operated pump (1), comprising a cup-shaped body (2) inside which a piston (3) associated with a hollow stem (4) for its movement in the cup-shaped body (2) sealingly slides, the manually operated pump (1) having a base (5), which closes the cup-shaped body (2), the base (5) having a hole (11) for the stem (4), the stem (4) and the base (5) being torsionally coupled, at least part of the cup shaped-body (2) and of the piston (3) defining a compression chamber (6) associated with at least one suction valve element (8) and a delivery valve element (9), the delivery valve element (9) being in communication with a cavity (4A) of the stem (4), a dispensing button (10) being sealingly fitted on the stem (4), the dispensing button (10) and the stem (4) being mutually constrained so that the dispensing button (10) limitedly rotates with respect to an axis (A) of the stem (4) between a first dispensing position and a second closing position in which at least one tooth (D) of the dispensing button (10) stops against a surface (13) of a ring nut (12) so as to prevent a stroke of the stem (4), the manually operated pump (1) being characterized in that the ring nut (12) is configured to be coupled torsionally to the base (5) or to the cup-shaped body (2) in at least two alternative mounting positions, such that, if the ring nut (12) is in its first mounting position and the dispensing button (10) is in the dispensing position, a first groove (S1) of the ring nut (12) faces the tooth (D) which can slide in it up to a first stop (F1), allowing a first stroke of the stem (4) and that, if the ring nut (12) is in its second mounting position and the dispensing button (10) is in the dispensing position, a second groove (S2) of the ring nut (12) faces the tooth (D) which can slide in it up to a second stop (F2), allowing a second stroke of the stem (4) different from the first stroke of the stem (4), so that, during the assembly of the manually operated pump (1) the positioning of the ring nut (12) in the first or second mounting position determines a first or a second delivery volume of the manually operated pump (1).

2. The manually operated pump (1) according to claim 1, wherein the base (5) is configured to be torsionally coupled to the cup-shaped body (2) in at least two alternative mounting angular positions, such that, if the base (5) is in its first mounting position, between the base (5) and the cup-shaped body (2), a passage (P) is open which puts the outside of the manually operated pump (1) in communication, at least for some positions of the piston (3), with the outside of the cup-shaped body (2), the manually operated pump (1) being in a vented configuration, while if the base (5) is in its second mounting position, said passage (P) is closed and the manually operated pump (1) is of a hermetic type.

3. The manually operated pump (1) according to claim 1, wherein, when the dispensing button (10) is in said second closing position, a cavity (4A) of the stem (4) is isolated from a delivery port (10A) of the dispensing button (10).

4. The manually operated pump (1) according to claim 1, in which the piston (3) is slidably fitted on the stem (4) and defines, in cooperation with the stem (4) itself, the delivery valve element (9).

5. The manually operated pump (1) according to claim 1, wherein the stem (4) has a guide (21) engaged in a counter-guide (20) of the base (5) to make said torsional coupling.

6. The manually operated pump (1) according to claim 1, wherein the base (5) has an alignment tooth (22) which can be engaged alternatively in a first seat (23A) or in a second seat (23B) of the ring nut (12), so that when the alignment tooth (22) is engaged in the first seat (23A), the manually operated pump (1) is in said first mounting position, while when the alignment tooth (22) is engaged in the second seat, the manually operated pump (1) is in said second mounting position.

7. The manually operated pump (1) according to claim 1, wherein the ring nut (12) has an annular seat (12A) in which a skirt (10B) of the dispensing button (10) slides.

8. The manually operated pump (1) according to claim 1, wherein the base (5) is snap-engaged with the ring nut (12).

9. The manually operated pump (1) according to claim 1, wherein the base (5) provides a flange (5A) sandwiched between the ring nut (12) and the cup-shaped body (2).

10. The manually operated pump (1) according to claim 2, wherein one between the base (5) and the cup-shaped body (2) has a projection (30) configured to sealingly intercept a passage (P) made in the other between the cup-shaped body (2) and the base (5), when the base (5) is in its second mounting position.

11. The manually operated pump (1) according to claim 10, wherein another between the cup-shaped body (2) and the base (5) provides a further seat (35) configured to house said projection (30) when the base (5) is in its first mounting position.

12. The manually operated pump (1) according to claim 11, wherein, in correspondence with said passage (P) there is a compartment (36) configured to house said projection (30) or a filter that filters the air flowing in said passage (P).

13. The manually operated pump according to claim 2, wherein the base (5) and the piston (3) each have a sealing coupling surface (3A, 37) configured to intercept the passage (P) when the stem (4) is in its upper end-of-stroke position.

14. The manually operated pump (1) according to claim 9, wherein the cup-shaped body (2) is in turn equipped with a further flange (2A) destined to abut, through a gasket (G), on a free surface of a mouth (B), a container (C) to which the manually operated pump (1) will be coupled during use.

* * * * *